INVENTOR.
HUNTER L. Mc.DOWELL
BY
Wm J. Nolan
ATTORNEY

INVENTOR.
HUNTER L. Mc. DOWELL
BY
Wm Nolan
ATTORNEY

INVENTOR.
HUNTER L. McDOWELL
BY Wm P. Nolan
ATTORNEY 3,308,336

PERIODIC SLOW WAVE CIRCUIT HAVING CAPACITIVE COUPLING BETWEEN ALTERNATE PERIODIC ELEMENTS

Hunter L. McDowell, Springfield, N.J., assignor to S-F-D Laboratories, Inc., Union, N.J., a corporation of New Jersey Filed Jan. 3, 1962, Ser. No. 164,008
1 Claim. (Cl. 315—39.69)

The present invention relates in general to microwave devices of the type wherein a traveling electromagnetic wave of phase velocity less than the velocity of light interacts with a medium such as a stream of particles (for example, electrons), and more particularly to novel techniques for increasing the interaction bandwidth of a slow wave circuit of the type comprising an array of conducting resonant rods.

The term "resonant rods" as used herein refers either to a conductive rod which extends for a distance $\lambda/4+n\lambda/2$ (where $\lambda$=wavelength at a reference operating frequency, $n$=0, 1, 2, etc.) from a single short-circuiting plane, or to a conductive rod which extends for a distance $(n+1)\lambda/2$ between two short-circuiting planes. Slow wave circuits employing an array of such rods having phase shifts per section of between $\pi/2$ and $\pi$ radians, while advantageously characterized by high interaction impedance and high power handling capabilities, have dispersion characteristics such that the phase velocity of wave propagation changes considerably with frequency. Such dispersion is particularly disadvantageous in those applications, such as broadband signal amplification, where it is desired to interact a constant velocity stream of particles with traveling electromagnetic waves of widely varying frequency, such interaction requiring that the phase velocity of the waves remain near the particle velocity, and hence substantially constant, over the frequency band of interest. Desirable forward wave dispersion characteristics have heretofore been obtained with phase shifts of between 0 and $\pi/2$ radians per section but such "fine grained" circuits are difficult to build at high frequencies and have relatively poor power handling capabilities.

Accordingly, it is the principal object of the present invention to obtain a broadband low dispersion slow wave circuit operating in the phase shift per section range from $\pi/2$ to $\pi$ radians.

One feature of the present invention is the provision of a resonant rod array slow wave structure adapted to propagate a forward wave with a phase shift of between $\pi/2$ and $\pi$ radians per rod.

Another feature of the present invention is the provision in a resonant rod array slow wave structure of means for capacitively coupling alternate resonant rods in the capacitive regions thereof (as used herein "alternate" means every other one).

Another feature of the present invention is the provision of means in accordance with the preceding paragraph comprising conducting strap members connected to each rod and extending in spaced-apart capacitive relation with respect to the strap members extending from alternate rods.

Figures 1A, 1B:
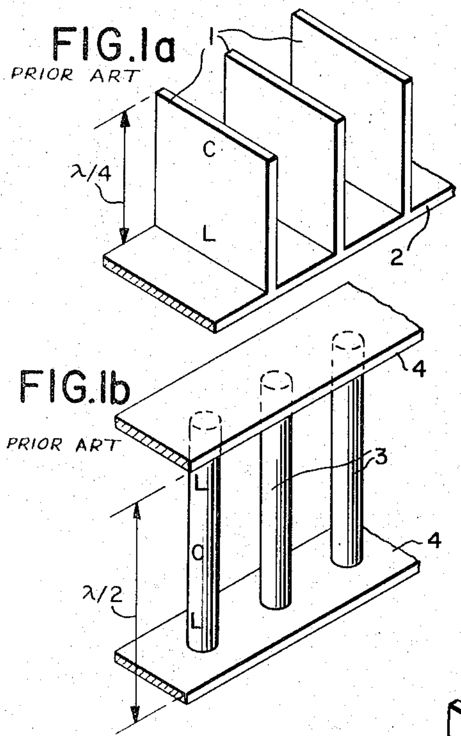
Figure 2:
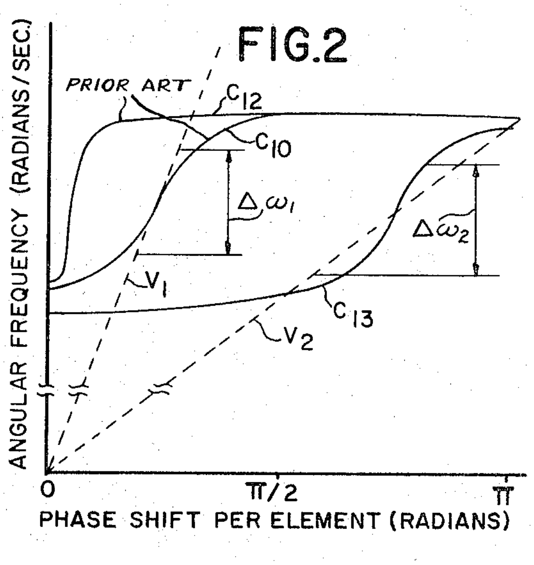
Figures 3, 5, 6, 7:
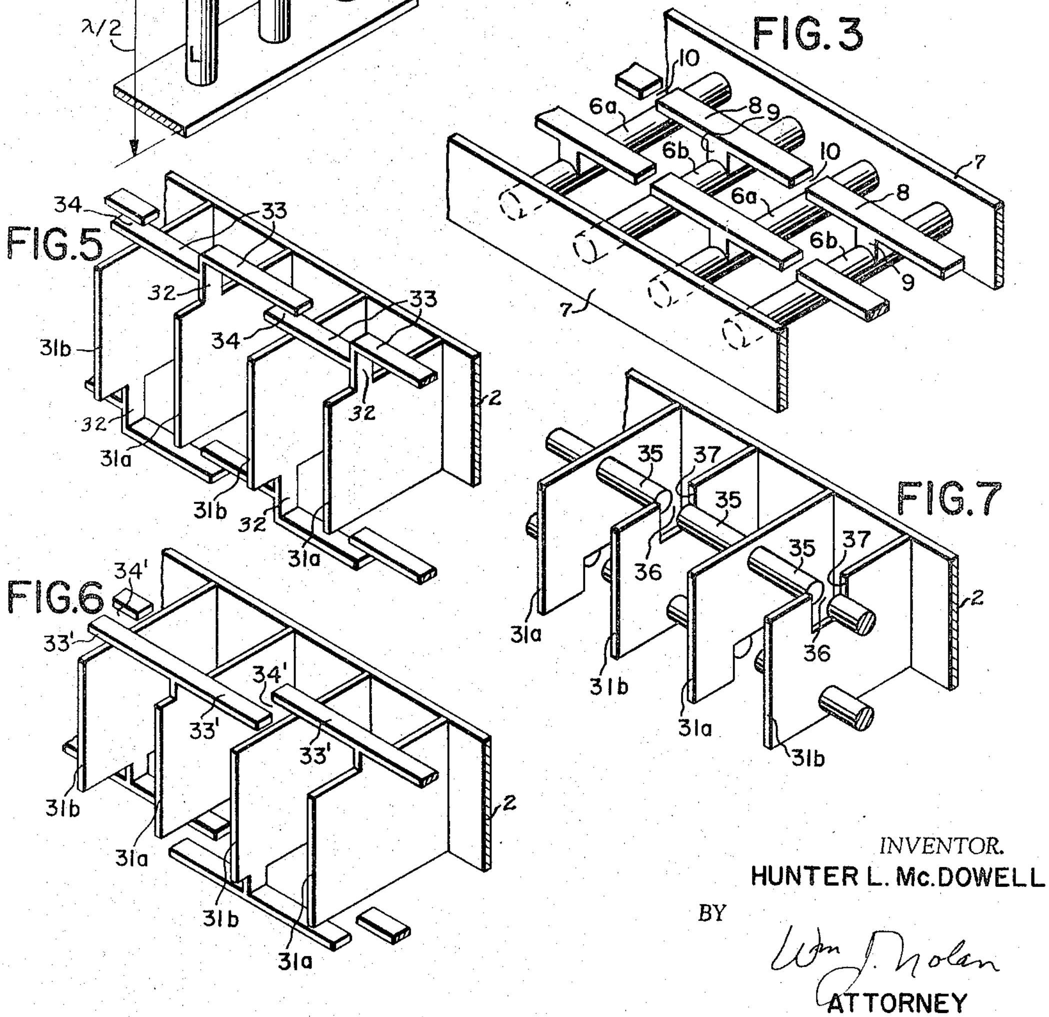
Figure 4:
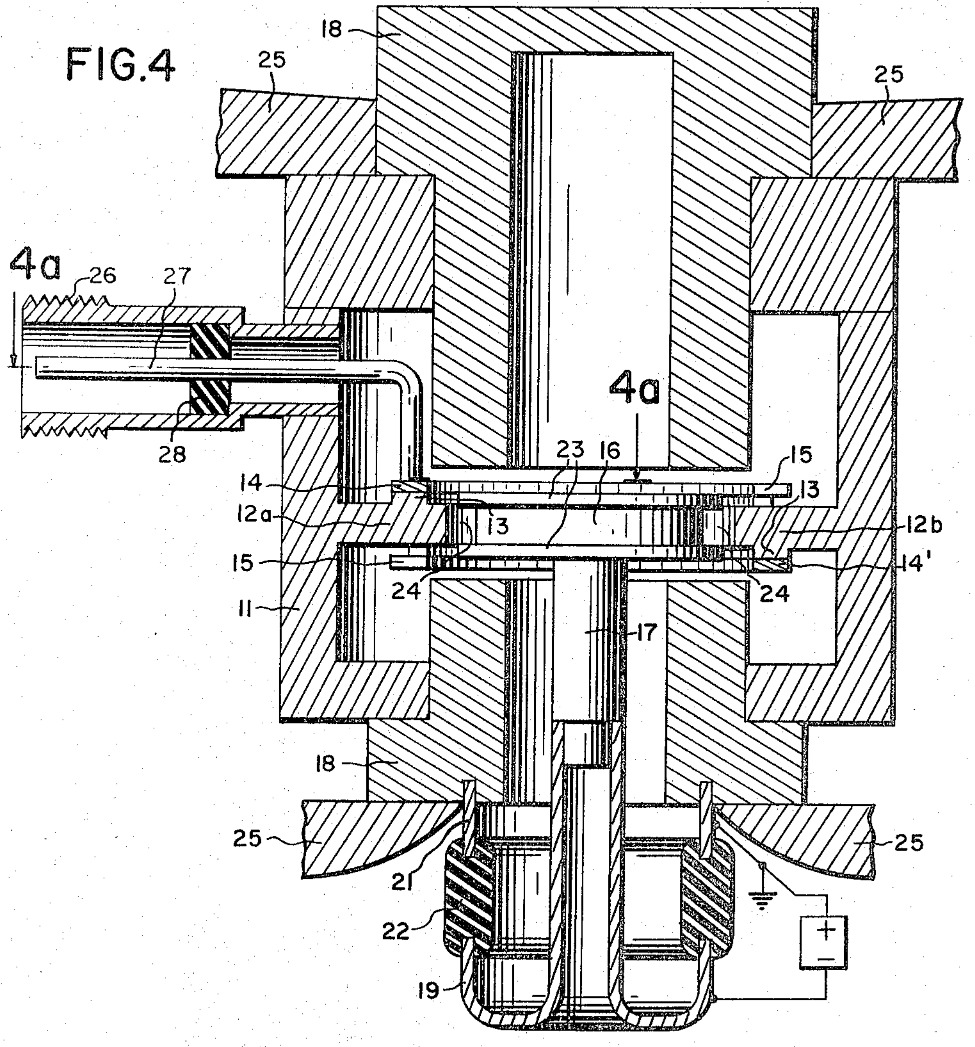
Figure 4A:
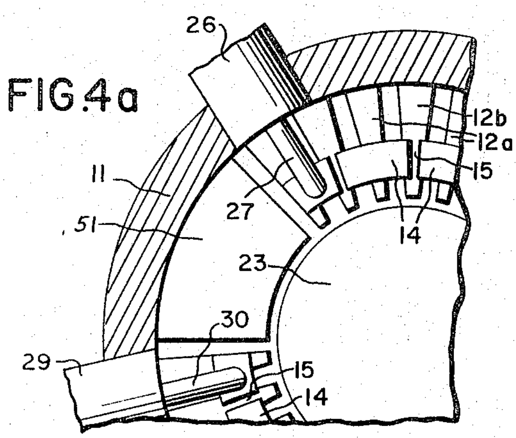
Figure 8:
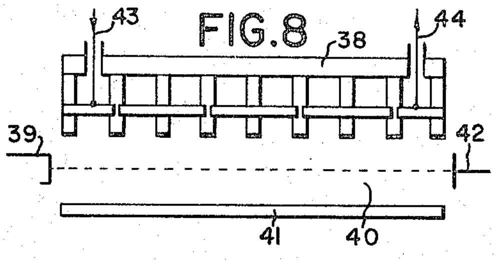
Figure 9:
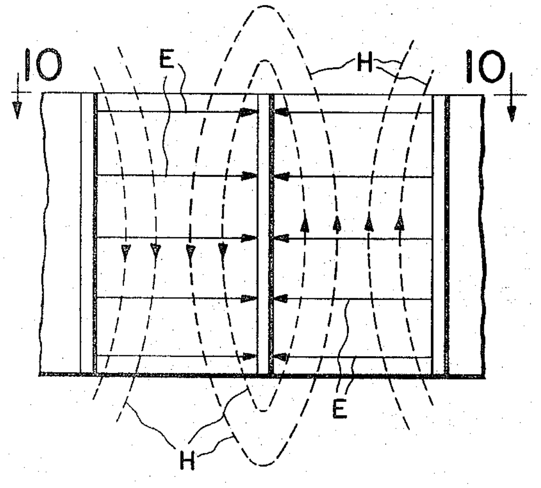
Figure 10:
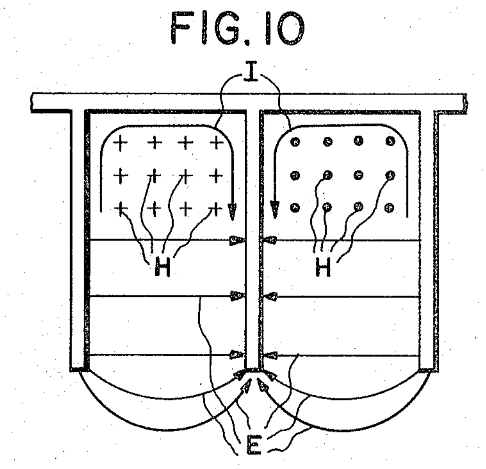
Figure 11:
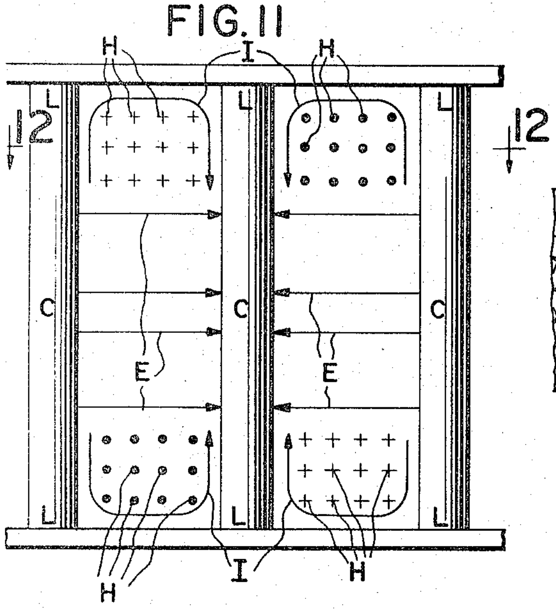
Figure 12:
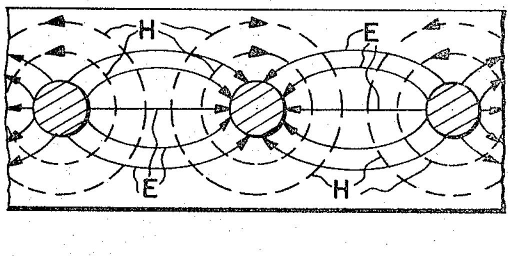

These and other features and advantages of the present invention will be more apparent after a perusal of the following specification taken in connection with the accompanying drawings wherein, FIGS. 1*a* and 1*b* are isometric views of two forms of slow wave circuits employing an array of resonant elements, FIG. 2 is a plot of dispersion curves for explaining the operation of resonant element array slow wave circuits, FIG. 3 is an isometric view of a half-wave rod circuit with capacitive coupling means in accordance with the present invention, FIG. 4 is a cross-sectional view of a novel cross-field amplifier tube in accordance with the present invention, FIG. 4*a* is a fragmentary cross-sectional view taken along line 4*a*—4*a* in FIG. 4, FIGS. 5, 6, and 7 are isometric views of quarter-wave vane slow wave circuits with different capacitive coupling structures in accordance with the present invention, FIG. 8 is a partially schematic view of a linear, injected beam, crossed-field amplifier tube having a slow wave circuit in accordance with the present invention, FIG. 9 is a side elevation view of the slow wave circuit of FIG. 1*a* depicting the electric and magnetic field lines, FIG. 10 is a plan view of the field line pattern of FIG. 9 taken along line 10—10 in the direction of the arrows, FIG. 11 is a side elevation view of the slow wave circuit of FIG. 1*b* showing the electric and magnetic fields thereof, and FIG. 12 is a transverse cross-sectional view of the circuit of FIG. 11 taken along lines 12—12 in the direction of the arrows.

FIGS. 1*a* and 1*b* illustrate two different types of prior art slow wave structures employing an array of resonant elements. In FIG. 1*a*, an array of quarter-wave conducting plates or vanes 1 is distributed along a conducting shorting plane number 2; and in FIG. 1*b* an array of half-wave rods 3 is distributed along a pair of spaced-apart conducting shorting members 4. The standing wave pattern established on such resonant elements exhibits characteristic regions of high electric field intensity, referred to herein as capacitive regions, and characteristic regions of high magnetic field intensity, referred to herein as inductive regions. In the structure of FIG. 1*a* (see FIGS. 9 and 10), a capacitive region C exists near the extremity of each vane 1, and an inductive region L exists near the base of each vane. In FIG. 1*b* (see FIGS. 11 and 12), a capacitive region C exists near the center of each rod 3, and a inductive region L exists near the shorted ends of each rod. FIGS. 1*a* and 1*b* represent conventional slow wave circuits which are used in conventional linear or circular beam tubes of the general type illustrated in FIGS. 4, 4*a* and 8.

Slow wave circuits of the types shown in FIGS. 1*a* and 1*b* may be used and have been used, for example, in electron traveling wave tubes in which an electron stream is passed adjacent the capacitive region. In the case of so-called M-type tubes, crossed unidirectional electric and magnetic fields are established in mutually perpendicular relationship with reference to the direction of the electron stream, and in the case of O-type tubes their fields are established collinearly with the stream. It may be noted that in the case of O-type tubes electrons may conveniently be directed down a passageway cut directly through the resonant elements rather than exterior to the elements as is the usual situation in M-type tubes. In both M and O type tubes the wave on the slow wave circuit cumulatively interacts with the electron stream to form bunches or spokes of electrons, respectively. A typical tube utilizing a slow wave circuit formed by a strapped circular array of resonant bars is shown in an article entitled "A 3-Megawatt, 15-Kilowatt S-Band Amplitron," Microwave Journal, October 1959, by W. A. Smith et al.

In order to explain the operation of the present invention, reference is made to the traveling wave dispersion curve plots of angular frequency vs. phase shift per element shown in FIG. 2. The relative phase velocity, in units of element separation lengths per second, for a wave at a given frequency is given by the slope of a straight line passing through the origin and the point on the curve at the frequency in question. A useful measure of the interaction bandwidth $\Delta\omega$ may be taken as that range of frequencies for which this relative phase velocity of the waves remains within 10% of the velocity of the interacting particles also expressed in element separation lengths per second.

Curve $C_{12}$ represents the dispersion characteristics of a simple resonant array circuit of the type shown in FIGS. 1*a* and 1*b*. In such structures the capacitive coupling between the capacitive regions of adjacent elements is substantially balanced by the coupling in the inductive regions so that the bandwidth is extremely narrow except for phase velocities which are prohibitively large for particle interaction. One previously proposed device for increasing the bandwidth of this type of structure consists of introducing a ground plane in the proximity of the capacitive region so as to establish an element-to-ground coupling which modifies the dispersion curve as indicated by $C_{10}$. In this way, an interaction bandwith $\Delta\omega_1$ with reference to a particle velocity given by the slope of curve $V_1$ is established in the region between zero and $\pi/2$ phase shift per element. However, such a prior art $C_{10}$ circuit is relatively "fine grained" due to the close spacing of the resonant elements whereas a circuit with $\pi/2$ to $\pi$ radians phase shift per element would be considered "coarse grained" and therefore, easier to build and having increased power handling capability at high frequencies.

According to the present invention, means are provided for capacitively coupling the capacitive regions of alternate elements whereby it is found that the dispersion curve is modified as indicated by $C_{13}$ to provide a substantial interaction bandwidth $\Delta\omega_2$ with reference to a particle velocity given by the slope of line $V_2$ in the region between $\pi/2$ and $\pi$ phase shift per element. This region is characterized by forward wave interaction since the direction of wave energy flow (given by the slope of the dispersion curve) is the same as that of the particle velocity.

Certain important advantages of this arrangement can now be pointed out. To establish a given absolute phase velocity, and hence a given phase shift per unit length along the circuit, at a given frequency, a smaller number of elements per unit length is required due to the larger phase shift per element, thus making possible relatively "coarse grained" structures of more rugged construction and greater heat-dissipation, and hence power-handling, capabilities. For a given spacing of elements, a substantially lower interacting particle velocity is required, thereby lowering, for example, the necessary particle acceleration voltages. With the phase shift per element in the region indicated, only a small amount of energy is stored in the coupling between alternate elements thereby enhancing the interaction impedance.

One example of a slow wave circuit in accordance with the present invention is shown in FIG. 3 wherein a plurality of half-wave rods 6 are supported between a pair of shorting members 7. The desired capacitive coupling is provided by aligned strip members 8 which are connected to each rod via a raised portion 9 and which have extending portion disposed in endwise spaced-apart relation with respect to the strips extending from alternate rods to form capacitive coupling gaps 10 therebetween. One band of members 8 couples one set of alternate bars 6*a*, and a second band couples the remaining bars 6*b*.

FIGS. 4 and 4*a* disclose a re-entrant type crossed-field electronic amplifier utilizing a quarter-wave vane circuit of the general type shown in FIGS. 1*a* and 5–7 provided with capacitive coupling elements of a type similar to those shown in FIGS. 3, 5–7 but more similar to the type shown in FIG. 3. The vanes 12 are formed by radially inwardly projecting extensions of the cylindrical anode envelope block 11. Each vane has a raised portion 13 to which a coupling member is connected, one set of alternate vanes 12*a* being coupled by a band of conductors comprising upper ring 14 with coupling gaps 15 therein and the other set alternate vanes being connected to a similar lower ring 14'.

A continuous cylindrical cathode 16, preferably a cold cathode made of a low work-function material such as beryllium-copper, is supported coaxially within the tube by means of a stem 17 extending through the lower of a pair of annular header members 18 to mate with an annular cathode connector 19 which is separated from anode connector 21 by means of an insulating ring 22. The joints between members 11, 18, 21, 22, 19 and 17 are sealed, as by brazing, to form a vacuum-tight envelope. The cathode 16 is mounted between a pair of end hats 23 which confine the emitted electrons to the interaction region 24 between the cathode 16 and the vanes 12. A vertically directed magnetic field is provided in this interaction region by means of a permanent magnet structure 25 (only a fragment of which is shown) communicating with the opposed headers 18 which are made of a magnetic material to serve as pole pieces. The crossed electric field in the region 24 is provided by means of a negative voltage applied from the grounded anode connector 21 to the cathode connector 19.

In operation, a signal which it is desired to amplify is fed to the vane circuit 12 via input coaxial connector 26, the inner conductor 27 of which is supported by vacuum-sealing disc 28 and is connected to the first coupling member of ring 14. This signal establishes a traveling wave in the interaction region 24 of sufficient intensity to initiate the emission of electrons in the case of a cold cathode 16, and this emission will be sustained without the necessity of supplying external heating power by secondary emission due to backbombarding electrons which have gained energy from the wave. The interacting electron stream moves through the region 24 with a clockwise circumferential velocity determined by the ratio of electric-to-magnetic field. The phase velocity of the traveling wave is approximately synchronous with this electron stream velocity for a wide band of frequencies so that the electrons deliver energy to and amplify waves within this band, the amplified output signal being taken out through output coaxial connector 29 which is similar in construction to the input connector 26 and which has its inner conductor 30 connected to the last coupling member of ring 14. It will be noted that the end coupling members, to which the inner coaxial conductors 27, 30 are attached, are cut flush with the end vanes for impedance matching. Also, the spacing of the initial and final few coupling gaps 15 may be varied to facilitate this match. The slow wave circuit is interrupted between the input and output connectors 26 and 29 to provide a drift segment 51 of sufficient length to permit electron debunching so that electrons may re-enter the interaction region for improved efficiency without producing undesired internal feedback.

It should be noted that whereas the slow wave structures in accordance with the present invention are useful with various types of traveling wave tubes, they are particularly useful in crossed-field or M-type tubes wherein an extensive interaction region is required, and also wherein the larger interception of electron current and the close spacing of elements required for operation at the lower electron velocities of these tubes intensify the problems of construction and heat dissipation. Such crossed-field tubes include versions wherein the interaction region is linear and also injected beam versions (both linear and re-entrant) in which the electron source is outside of the interaction region. An example of a linear, injected beam tube is given in subsequently described FIG. 8. The combination in a crossed-field tube of these slow wave structures with a continuous cathode—that is, one emitting electrons throughout the entire interaction region—as shown, for example, in FIG. 4, is of special importance in view of the tendency of the backward wave fundamental of space harmonic structures, for example, interdigital lines, to interfere with the electron bunching process required for proper operation with this type cathode.

FIGS. 5, 6, and 7 illustrate additional coupling structures in accordance with the present invention which are shown for a quarter-wave vane circuit, but which are readily adaptable, for example, to a half-wave rod circuit as shown in FIG. 3.

In FIG. 5, each vane 31 as carried from the shorting plane member 2 has a raised portion 32 for supporting skewed strip extension members 33 which overlap in surface spaced-apart relation with respect to the extension member from alternate vanes to provide the desired capacitive coupling gaps 34 therebetween, one set of alternate vanes 31*a* being coupled by a band of conducting members at the top edge thereof and the other set 31*b* by a band at the bottom edge thereof.

In FIG. 6, the extending strip portions 33' are aligned but staggered with respect to the extending portions from alternate vanes in side edge spaced-apart overlapping relation to provide coupling gaps 34' therebetween.

In FIG. 7, each vane 31 has a pair of aligned extending members in the form of pins 35 which are endwise spaced-apart with respect to the rods extending from alternate vanes to form coupling gaps 36 within a cut-out portion 37 in the intermediate vanes. This provides an extremely compact structure which has the added advantage of bandwidth enhancement due to the reduced capacitive coupling between adjacent vanes caused by cutting out portion 37.

A linear, injected beam, crossed-field amplifier tube is represented in FIG. 8 which utilizes an anode 38 having an alternately coupled slow-wave structure in accordance with the present invention connected thereto. The external electron gun 39 directs an electron stream through the crossed-field interaction region 40 formed between the non-emitting cathode plate or sole 41 and the anode 38, said stream being terminated by collector 42. The slow-wave circuit is energized by the input connector 43 to establish a wave which is amplified by interaction with the electron stream and extracted via output connector 44.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A slow wave structure comprising an arcuate array of parallel directed resonant rods having an axis of revolution for defining an arcuate path of wave propagation around said axis of revolution, means for capacitively coupling together alternate rods in the capacitive regions thereof, said means for capacitively coupling together alternate rods comprising essentially only a pair of elongated arcuate conductive strap members extending along said array of resonant rods with each strap being connected to alternate rods, each of said strap members being segmented intermediate their points of connection to alternate rods to provide said means for capacitively coupling together alternate rods of said array, said segmented strap members being coaxial with the axis of revolution and axially spaced apart in the direction of the axis of revolution, and including means extending around and interconnecting the common ends of said array of rods for shorting together the ends of said rods to define an array of half wavelength slot resonators in the spaces between adjacent shorted rods, whereby said slow wave structure is caused to have a fundamental forward wave dispersion characteristic.

References Cited by the Examiner

UNITED STATES PATENTS

| | | | |
|---|---|---|---|
| 2,890,384 | 6/1959 | Dench | 315—39.3 |
| 2,925,518 | 2/1960 | Osepchuk | 315—3.5 |
| 3,096,457 | 7/1963 | Smith et al. | 313—103 |
| 3,176,188 | 3/1965 | Wilbur | 315—39.69 |
| 3,192,435 | 6/1965 | Feinstein et al. | 315—39.69 |

FOREIGN PATENTS

| | | | |
|---|---|---|---|
| 863,992 | 1/1961 | Great Britain. | |

JAMES W. LAWRENCE, *Primary Examiner.*

GEORGE N. WESTBY, *Examiner.*

V. LAFRANCHI, *Assistant Examiner.*